United States Patent
Son et al.

(10) Patent No.: US 7,639,322 B2
(45) Date of Patent: Dec. 29, 2009

(54) LIQUID CRYSTAL DISPLAY DEVICE AND METHOD FOR MANUFACTURING THE SAME

(75) Inventors: Dong-soo Son, Suwon-si (KR); Seo-hee Ha, Suwon-si (KR); Sung-ku Kang, Suwon-si (KR); Jong-su Lee, Suwon-si (KR); Toshihiro Aoki, Suwon-si (KR); Jai-sang Jung, Suwon-si (KR)

(73) Assignee: Samsung Mobile Display Co., Ltd., Suwon-si, Gyeonggi-do (KR)

( * ) Notice: Subject to any disclaimer, the term of this patent is extended or adjusted under 35 U.S.C. 154(b) by 145 days.

(21) Appl. No.: 12/010,046

(22) Filed: Jan. 18, 2008

(65) Prior Publication Data

US 2008/0117378 A1 May 22, 2008

(30) Foreign Application Priority Data

Jan. 22, 2007 (KR) ...................... 10-2007-0006572

(51) Int. Cl.
*G02F 1/1335* (2006.01)
*G02F 1/1339* (2006.01)

(52) U.S. Cl. ...................................... 349/106; 349/155
(58) Field of Classification Search ........................ None
See application file for complete search history.

(56) References Cited

U.S. PATENT DOCUMENTS

2006/0092351 A1* 5/2006 Kim et al. .................... 349/110
2006/0139550 A1* 6/2006 Yoo et al. .................... 349/141
2007/0070286 A1* 3/2007 Cho et al. .................... 349/156
2008/0002137 A1* 1/2008 Kim et al. .................... 349/187

FOREIGN PATENT DOCUMENTS

| JP | 2006-300975 | | 11/2006 |
|---|---|---|---|
| KR | 10-2004-0092598 | | 11/2004 |
| KR | 10-2005-0113491 | A | 12/2005 |
| KR | 10-2006-0031336 | A | 4/2006 |
| KR | 10-2006-0077369 | A | 7/2006 |

* cited by examiner

*Primary Examiner*—Tina M Wong
(74) *Attorney, Agent, or Firm*—Lee & Morse, P.C.

(57) ABSTRACT

A liquid crystal display device includes a first substrate having a plurality of first electrodes, a second substrate facing the first substrate and having a plurality of second electrodes perpendicular to the first electrodes to define sub-pixels at intersection regions between the first and second electrodes, a liquid crystal layer between the first and second substrates, a plurality of color filters between the first and second substrates adapted to correspond to respective sub-pixels, the color filters including first color filters and second color filters having a different shape than the first color filters, a black matrix between the color filters, the black matrix including vertical portions, horizontal portions, and step portions, each of the step portions corresponding to a respective second color filter, and a plurality of patterned spacers between the first and second substrates, each of the patterned spacers overlaps with a respective step-portion of the black matrix.

20 Claims, 4 Drawing Sheets

LIQUID CRYSTAL DISPLAY DEVICE AND METHOD FOR MANUFACTURING THE SAME

BACKGROUND OF THE INVENTION

1. Field of the Invention

Embodiments of the present invention relate to a liquid crystal display device. More particularly, embodiments of the present invention relate to a liquid crystal display device with patterned spacers and a method for manufacturing the same.

2. Description of the Related Art

Liquid crystal display (LCD) devices refer to flat display devices employing electro-optical properties of liquid crystal molecules to display images, thereby requiring low power consumption and having low weight. More specifically, the conventional LCD device may include a liquid crystal layer between two substrates, so application of voltage to the LCD may modify polarization of light passing through the liquid crystal layer. Such conventional LCD devices may be classified into a twist nematic LCD (TN-LCD) and a super twist nematic LCD (STN-LCD) with respect to a twist degree of liquid crystal molecules in the liquid crystal layer between the substrates. For example, the conventional STN-LCD may have a twist angle of about 240 degrees to about 270 degrees, and may be of a passive matrix type, i.e., each pixel may be driven by two electrode terminals, as opposed to being driven independently via a switching transistor and a diode.

The conventional LCD device may be formed by sealing the two substrates with the liquid crystal layer therebetween. Spacers may be placed between the two sealed substrates in order to maintain a cell gap therebetween. The conventional spacers may have a spherical shape, and may be scattered by, e.g., a nozzle jet.

However, scattering of the spherically-shaped spacers may cause non-uniform distribution thereof on the substrate, thereby triggering a non-uniform cell gap in the LCD device, which in turn, may cause light leakage and stain-like appearance phenomenon in one or more areas of the LCD panel. Further, scattering of the spherically-shaped spacers may trigger an overlap between the spacers and pixels of the LCD device, thereby decreasing luminance and overall display quality thereof.

SUMMARY OF THE INVENTION

Embodiments of the present invention are therefore directed to a liquid crystal display (LCD) device and a method for manufacturing the same, which substantially overcome one or more of the disadvantages of the related art.

It is therefore a feature of an embodiment of the present invention to provide a LCD exhibiting reduced light leakage.

It is another feature of an embodiment of the present invention to provide a LCD exhibiting improved display qualities.

It is yet another feature of an embodiment of the present invention to provide a method for manufacturing a LCD device exhibiting one or more of the above features.

At least one of the above and other features and advantages of the present invention may be realized by providing a LCD device including a first substrate having a plurality of first electrodes, a second substrate facing the first substrate and having a plurality of second electrodes, the second electrodes being perpendicular to the first electrodes to define sub-pixels at intersection regions between the first and second electrodes, a liquid crystal layer between the first and second substrates, a plurality of color filters between the first and second substrates adapted to correspond to respective sub-pixels, the color filters including first color filters and second color filters having a different shape than the first color filters, a black matrix between the color filters, the black matrix including vertical portions, horizontal portions, and step portions, each of the step portions corresponding to a respective second color filter, and a plurality of patterned spacers between the first and second substrates, each of the patterned spacers overlapping with a respective step-portion of the black matrix. The LCD may further include first and second alignment layers on inner surfaces of the first and second substrates, respectively.

The black matrix may be on an inner surface of the second substrate. The color filters may include red, green, and blue color filters. The three sub-pixels corresponding to red, green, and blue color filters may define a single unit pixel with one second filter. The second filter may be a red, green, or blue color filter. The second filters may have a bent shape. The bent shape of the second filters may be a shape having a missing corner portion as compared to a shape of the first color filters. The step portion of the black matrix may be positioned to replace the missing corner portion of a respective second color filter. The second filters may be longitudinal. The first color filters may have a substantially same shape as the sub-pixels. The patterned spacers may be in direct contact with the second electrodes.

Each step portion of the black matrix may be in contact with the vertical and horizontal portions of the black matrix. The step portion of the black matrix may be wider than the vertical portion of the black matrix. Each of the patterned spacers may be entirely overlapping with a respective step-portion of the black matrix. The step portion of the black matrix may be wider than a diameter of the patterned spacer. The patterned spacers may be positioned at equal intervals from one another.

At least one of the above and other features and advantages of the present invention may be further realized by providing a method for manufacturing a LCD device, including forming a first substrate having a plurality of first electrodes to face a second substrate having a plurality of second electrodes, the second electrodes being perpendicular to the first electrodes to define sub-pixels at intersection regions between the first and second electrodes, forming a liquid crystal layer between the first and second substrates, forming a plurality of color filters between the first and second substrates to correspond to respective sub-pixels, the color filters including first color filters and second color filters having a different shape than the first color filters, forming a black matrix between color filters, the black matrix including vertical portions, horizontal portions, and step portions, each of the step portions corresponding to a respective second color filter, and forming a plurality of patterned spacers between the first and second substrates, each of the patterned spacers overlapping with a respective step-portion of the black matrix.

Forming the first and second color filters may include forming the second color filters to have a bent shape having a smaller cross-sectional area than the first color filters. Forming the first and second color filters may include forming red, green, and blue color filters to define a single unit pixel, so each unit pixel includes two first color filters and one second color filter.

BRIEF DESCRIPTION OF THE DRAWINGS

The above and other features and advantages of the invention will become more apparent to those of ordinary skill in the art by describing in detail exemplary embodiments thereof with reference to the attached drawings, in which.

DETAILED DESCRIPTION OF THE INVENTION

Figure 1:
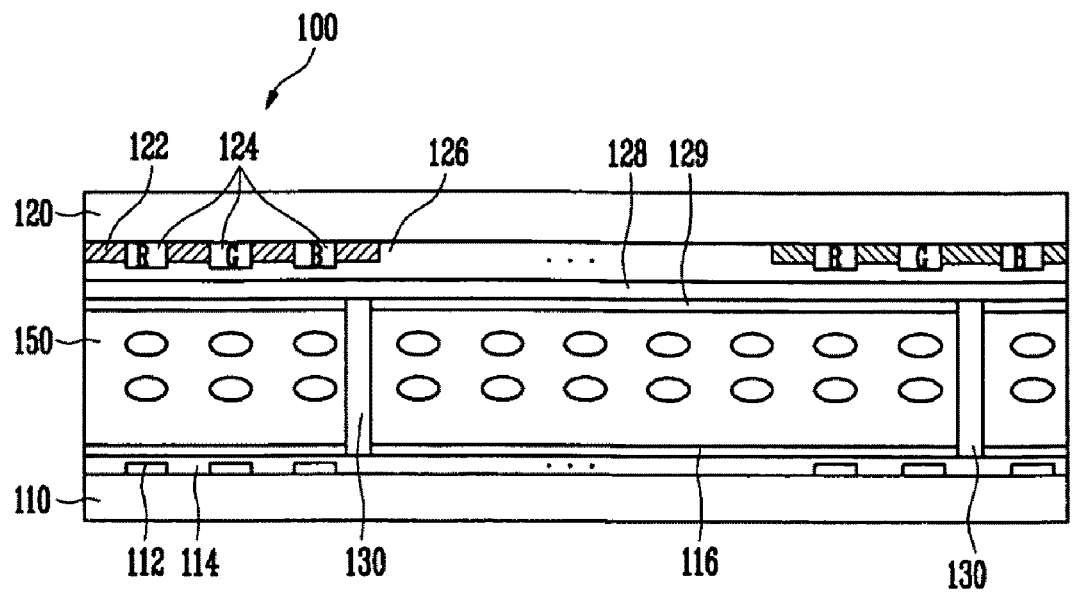
FIG. 1 illustrates a schematic cross-sectional view of a liquid crystal display (LCD) device according to an embodiment of the present invention.

Korean Patent Application No. 10-2007-0006572, filed on Jan. 22, 2007, in the Korean Intellectual Property Office, and entitled: "Liquid Crystal Display Device and Method for Manufacturing the Same," is incorporated by reference herein in its entirety.

Embodiments of the present invention will now be described more fully hereinafter with reference to the accompanying drawings, in which exemplary embodiments of the invention are illustrated. Aspects of the invention may, however, be embodied in different forms and should not be construed as limited to the embodiments set forth herein. Rather, these embodiments are provided so that this disclosure will be thorough and complete, and will fully convey the scope of the invention to those skilled in the art.

In the figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Hereinafter, an exemplary embodiment of a liquid crystal display (LCD) device according to the present invention will be described in more detail below with reference to FIGS. 1-2.

Figure 2:
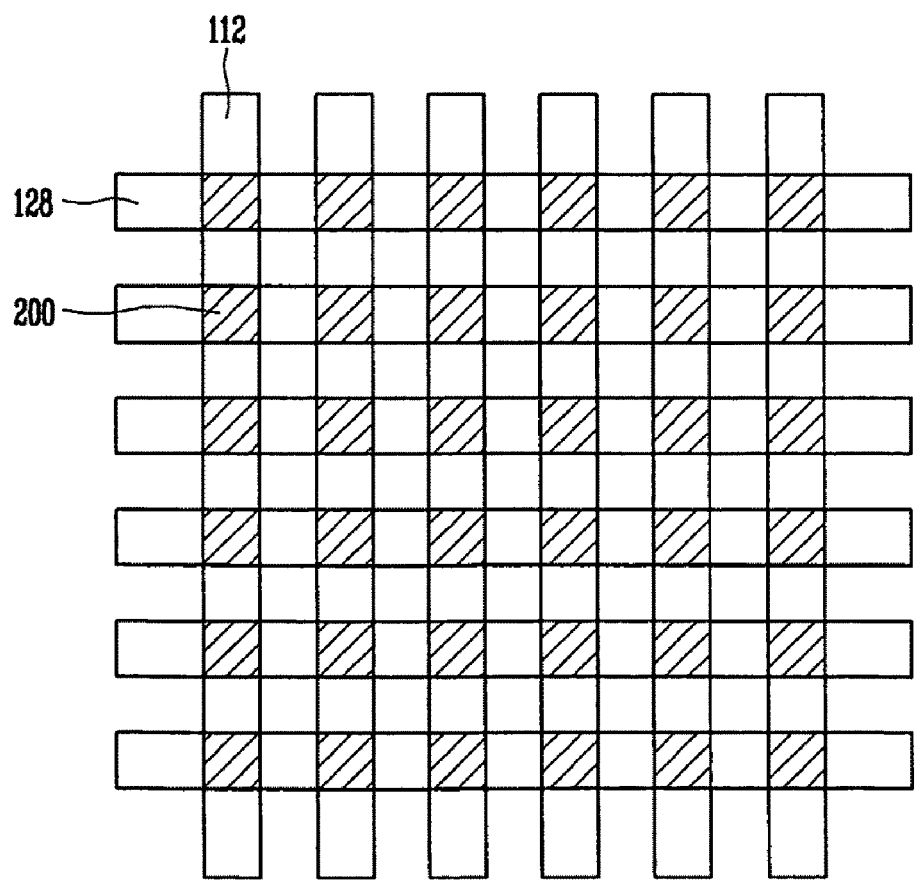
FIG. 2 illustrates a plan view of first and second electrodes structure in the LCD device of FIG. 1.

Referring to FIG. 1, a LCD device 100, e.g., a passive-matrix operated LCD, may include first and second substrates 110 and 120 facing one another to form an inner space therebetween for a liquid crystal layer 150, a plurality of patterned spacers 130 positioned vertically between the first and second substrates 110 and 120 to maintain a uniform cell gap therebetween, and first and second alignment layers 116 and 129 on inner surfaces of the first and second substrates 110 and 120, respectively. Rubbing of the first and second alignment layers 116 and 129 may determine an alignment angle of the liquid crystal layer 150. "Inner surfaces" refer hereinafter to surfaces of layers and/or elements facing the liquid crystal layer 150.

Figure 3:
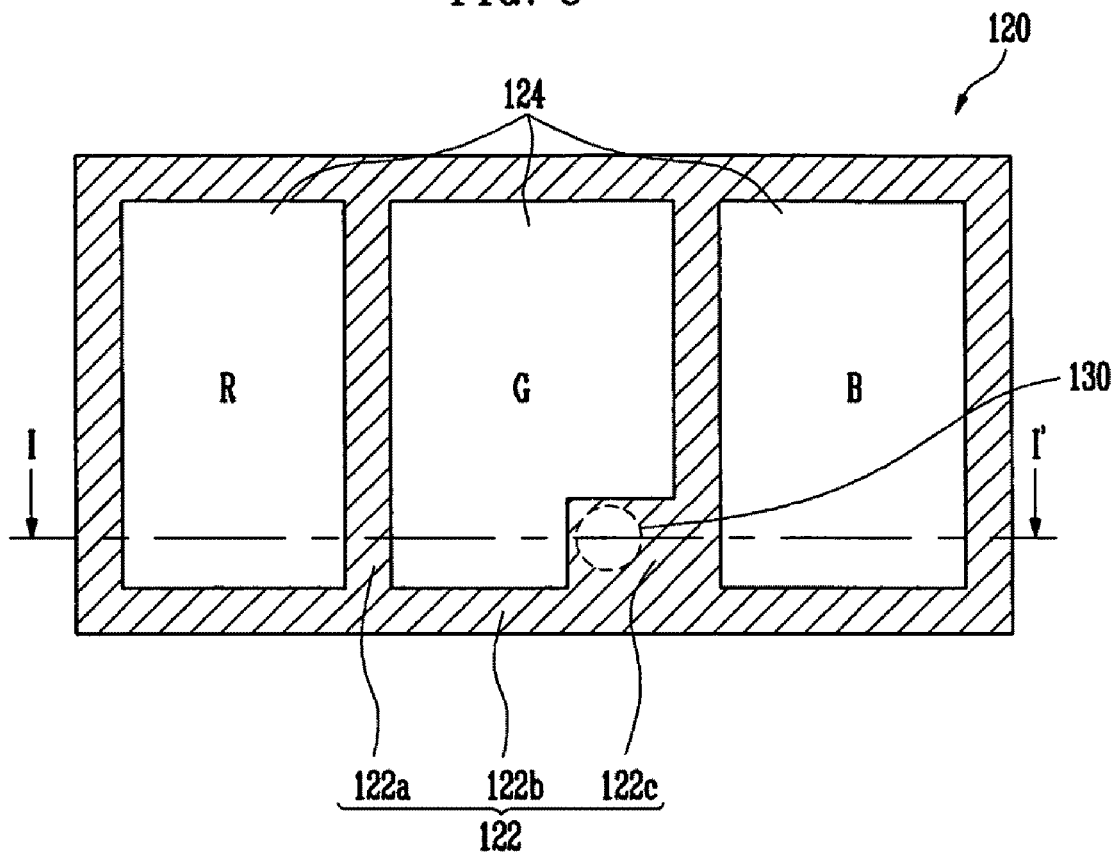
FIG. 3 illustrates a partial enlarged plan view through a second substrate of the LCD device of FIG. 1.

Additionally, as illustrated in FIG. 1, pluralities of first and second electrodes 112 and 128 may be patterned on inner surfaces of the first and second substrates 110 and 120, respectively. The second electrodes 128 may be perpendicular to the first electrodes 112, so intersection regions therebetween may define sub-pixel regions 200, as illustrated in FIG. 2. Each sub-pixel region 200 may include a corresponding color filter 124 formed on an inner surface of the second substrate 120 to emit a red (R), green (G), or blue (B) light, as further illustrated in FIG. 1. A black matrix 122, i.e. a pixel non-display region for preventing leakage of light between adjacent sub-pixel regions 200, may be formed on an inner surface of the second substrate 120 between adjacent color filters 124, so the patterned spacers 130 may overlap therewith, as will be described in more detail below with respect to FIGS. 3-4. FIG. 3 illustrates a partial plan view of the black matrix 122 and the filters 124 through the second substrate 120, and FIG. 4 illustrates a partial cross-sectional view along line I-I' of FIG. 3.

Figure 4:
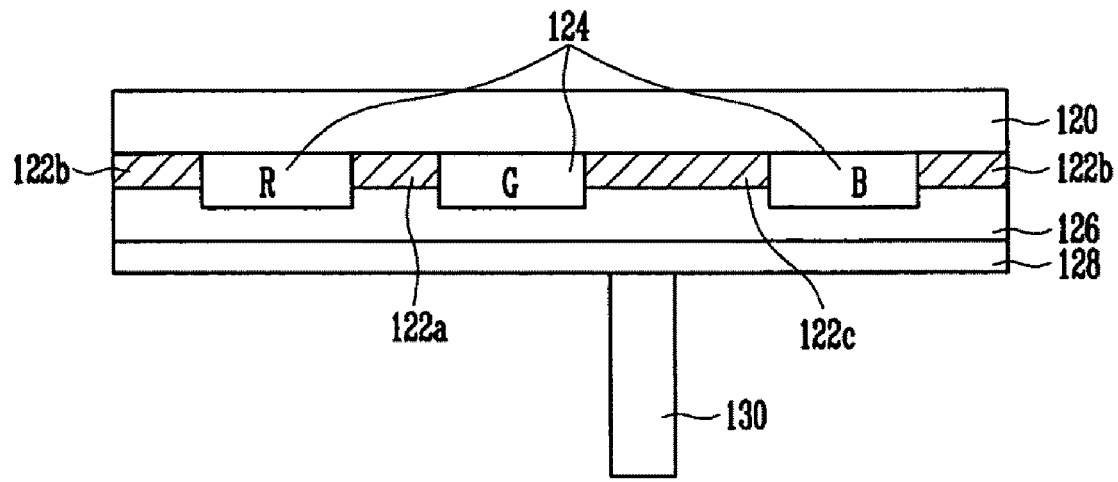
FIG. 4 illustrates a cross-sectional view along line I-I' of FIG. 3.

Referring to FIGS. 3-4, the black matrix 122, the color filters 124, and the second electrodes 128 may be deposited on the inner surface of the second substrate 120 of the LCD device 100. More specifically, the black matrix 122 may be formed on the inner surface of the second substrate 120 to have a matrix-structure, e.g., intersecting vertical and horizontal portions 122a and 122b, to define a plurality of sub-pixel regions 200 therebetween. The black matrix 122 may further include a step portion 122c, as illustrated in FIG. 3. The step portion 122c may be integral with the vertical and horizontal portions 122a and 122b, so two edges of the step portion 122c may be in contact with the vertical and horizontal portions 122a and 122b, as further illustrated in FIG. 3. The step portion 122c may be wider than the vertical portion 122a as measured along a direction of the second electrodes 128, as illustrated in FIG. 4.

A color filter 124, i.e., R, G, or B color filter 124, may be formed in each sub-pixel region 200, so three sub-pixels regions 200, i.e., sub-pixel regions emitting R, G, and B lights, may define one unit pixel. The color filters 124 may be formed on the inner surface of the second substrate 120, and may be surrounded by portions of the black matrix 122 to prevent optical interference between adjacent sub-pixel regions 200. The color filters 124 may include first type color filters, e.g., R color filter 124 in FIG. 3, having a quadrangle cross sectional structure in a horizontal plane, and may include second type color filters, e.g., G color filter 124 in FIG. 3, having an irregularly shaped cross-sectional structure in the horizontal plane.

More specifically, a predetermined number of color filters 124, i.e., second type color filters, may have a bent shape. For example, as illustrated in FIG. 3, one color filter 124, i.e., R, G, or B color filter 124, of three color filters 124 in each unit pixel, may have a bent shape, i.e., a structure having a missing portion as compared to a structure of the first type color filter, so a cross-sectional area thereof may be smaller that that of the first type color filter. As a further example, as illustrated in FIGS. 3-4, the G color filter 124 may have a missing corner portion as compared to a quadrangle structure of the adjacent R and/or B color filters 124 of the same unit pixel. The step portion 122c of the black matrix 122 may be positioned to correspond to the missing portion of the second type color filter, e.g., fit into the missing corner of the G color filter 124. As illustrated in FIG. 3, the irregularly shaped color filter 124 may be longitudinal, i.e., extend vertically in a direction parallel to the first electrodes 112.

The second electrodes 128 and the second alignment layer 129 may be formed sequentially on inner surfaces of the color filters 124 and the black matrix 122. Reference voltage for driving the LCD 100 may be applied between the first and second substrates 110 and 120 through the first and second electrodes 112 and 128 to adjust the first and second alignment layers 116 and 129. First and second planarization layers 114 and 126 may be formed on the inner surfaces of the first and second substrates 110 and 120, respectively, as illustrated in FIG. 1.

The patterned spacers 130 of the LCD 100 may be formed on the first substrate 110 at predetermined intervals, and may extend vertically in an upward direction towards the second substrate 120, as illustrated in FIG. 1. The patterned spacers 130 may be in contact with the planarization layer 126 and/or with the second electrodes 128, and may be positioned to correspond to the step portion 122c of the black matrix 122. That is, each patterned spacer 130 may have a narrower diameter than the width of the step portion 122c, so an upper portion of each patterned spacer 130 may entirely overlap with the step portion 122c of the black matrix 122, as illustrated in FIG. 3. The patterned spacers 130 may have a longitudinal structure, e.g., column-shaped spacer, and may be formed of a photo-spacer material. Further, the patterned spacers 130 may have, e.g., a circular, an ellipsoid, a rectangular, and so forth, cross-sectional area in the horizontal plane. The diameter of the patterned spacer 130 may be, e.g., about 17 μm.

Forming predetermined color filters 124 to have an irregular shape and adjusting respective portions of the black matrix 122 to fit with the irregular shapes in order to facilitate an overlap between the black matrix 122 and the patterned spacers 130 may be advantageous in substantially minimizing or preventing light leakage between adjacent sub-pixels 200 during alignment of the first and second alignment layers 116 and 129. That is, positioning of the patterned spacers 130 outside the pixel region, i.e., overlapping with the black matrix 120, may eliminate overlap between the patterned spacers 130 and the pixel region, thereby improving light transmissivity and display quality. Further, the patterned spacers 130 may maintain a uniform cell gap between the first and second substrates 110 and 120, thereby eliminating light leakage and staining phenomenon.

According to another exemplary embodiment of the present invention, a method for manufacturing the LCD device 100 will be described in more detail below with respect to FIGS. 5A-5D. FIGS. 5A-5D illustrate cross-sectional views corresponding to the LCD device 100 in FIG. 4.

Figure 5A:
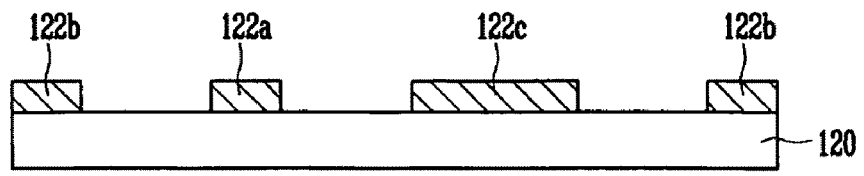
FIGS. 5A-5D illustrate cross-sectional views of sequential stages during manufacturing of a LCD device according to an embodiment of the present invention.

Referring to FIG. 5A, the second substrate 120 may formed of any suitable transparent material, and may be coated with a non-transparent material (not shown). More specifically, the non-transparent material may be coated on an entire surface of the second substrate 120, and may include a non-transparent metal, e.g., chromium (Cr), and/or a non-transparent resin. Next, a photoresist mask (not shown) having a pattern corresponding to the black matrix 122 may be deposited on the non-transparent material. The photoresist mask may be exposed and developed, and may be used as an etch mask to pattern the non-transparent material into the black matrix 122. The black matrix 122 may be formed to have a matrix structure with predetermined portions being irregularly shaped, e.g., being wider. For example, as illustrated in FIG. 5A, the step portion 122c may be wider than the vertical portion 122a as measured along a direction of the second electrodes 128.

Figure 5B:
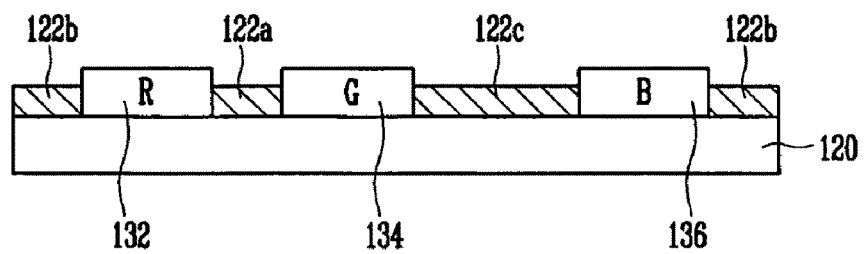

Next, referring to FIG. 5B, a red color resist may be coated on predetermined regions of the second substrate 120 between portions of the pixel non-display region 122, followed by soft-baking in a hot plate of about 80° C. to about 110° C. for a predetermined period of time, so the red color resist may be developed. Thereafter, the developed red color resist may be post-baked to form red color filter patterns 132 on the second substrate 120 between portions of the black matrix 122, i.e., including peripheral portions of the black matrix 122. Once the red color filter patterns 132 are formed, green color filters 134 may be formed on the second substrate 120 in regions adjacent to the red color filter patterns 132, as further illustrate in FIG. 5B, according to a substantially same method described with respect to formation of the red color filter patterns 132. Finally, blue color filters 136 may be formed on the second substrate 120 in regions between red and green color filter patterns 132 and 134, as further illustrate in FIG. 5B, according to a substantially same method described with respect to formation of the red color filter patterns 132.

In this respect, it should be noted that formation of either of the red, green, and/or blue color patterns 132, 134, and/or 136 to have a bent shape corresponding to the step portion 122c of the black matrix 122, may include using a mask having an irregular shape, as opposed to a quadrangle shape. For example, the green color filter patterns 134 may be formed with a different mask as compared to the red and blue color filter patterns 132 and 136. Further, the red, green, and/or blue color patterns 132, 134, and/or 136 may have a substantially same thickness, i.e., a vertical distance, and may be thicker that the black matrix 122.

Figure 5C:
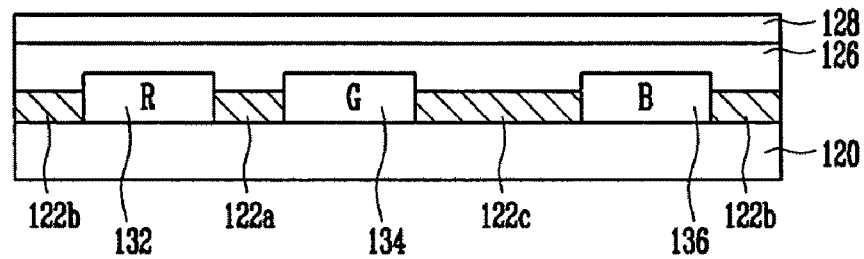

Next, as illustrated in FIG. 5C, the planarization layer 126 may be deposited to cover the black matrix 122 and the red, green, and blue color filter patterns 132, 134, and 136. The planarization layer 126 may protect the black matrix 122 and the red, green, and blue color filter patterns 132, 134, and 136 from external impacts and/or environment conditions, and may provide a uniform surface for depositing the second electrodes 128 for driving the LCD 100 via voltage application.

More specifically, the planarization layer 126 may be formed by depositing an organic transparent resin having a high surface hardness and an excellent optical transmissivity, e.g., one or more of acryl, polyimide, polyacrylate, and/or polyurethane, to a predetermined thickness on the black matrix 122 and the red, green, and blue color filter patterns 132, 134, and 136. Next, the organic transparent resin may be heated for about one hour in a bake oven at a temperature of about 200° C. to form the planarization layer 126.

Thereafter, a transparent metal, e.g., indium-tin-oxide (ITO) may be deposited to a thickness of less than about 1500 angstroms on the planarization layer 126 to form the second electrodes 128.

Figure 5D:
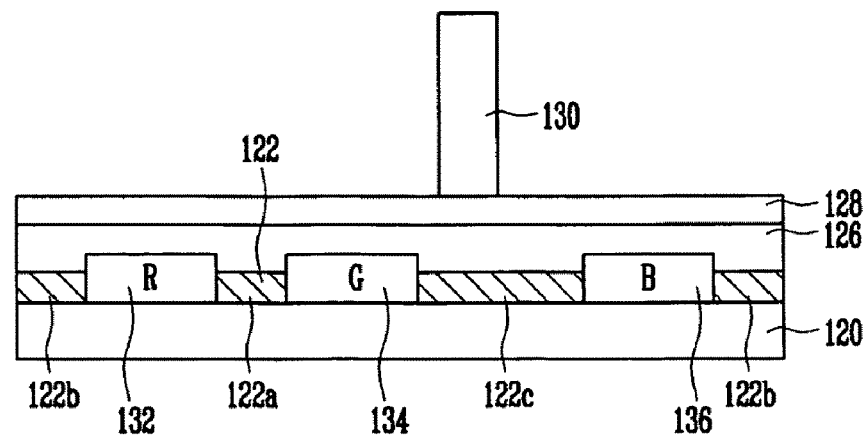

Finally, as illustrated in FIG. 5D, the patterned spacers 130 may be formed on the second electrodes 128 or on the planarization layer 126 in a region corresponding to the step region 122c of the black matrix 122. In detail, the patterned spacers 130 may be formed by forming a mixture of a solvent, a binder, a monomer, and a photoinitiator, followed by printing and drying the mixture on the second electrodes 128 or on the planarization layer 126. The drying may trigger evaporation of the solvent, thereby solidifying the spacer material. Once the spacer material is complete, a photoresist may be coated on the spacer material to facilitate etching. A photoresist pattern may be formed by performing exposure and development processes, i.e., selectively illuminating ultraviolet light, on the photoresist. The patterned spacer 130 having a predetermined height may be formed by patterning the spacer material by an etching process using the photoresist pattern as a mask.

Once the spacers 130 are formed on the second substrate 120, the first substrate 110 may be attached thereto with the liquid crystal layer 150 therebetween, as illustrated in FIG. 1. The first and second substrates 110 and 120 may be sealed to complete the LCD device.

EXAMPLE

Figure 6A:
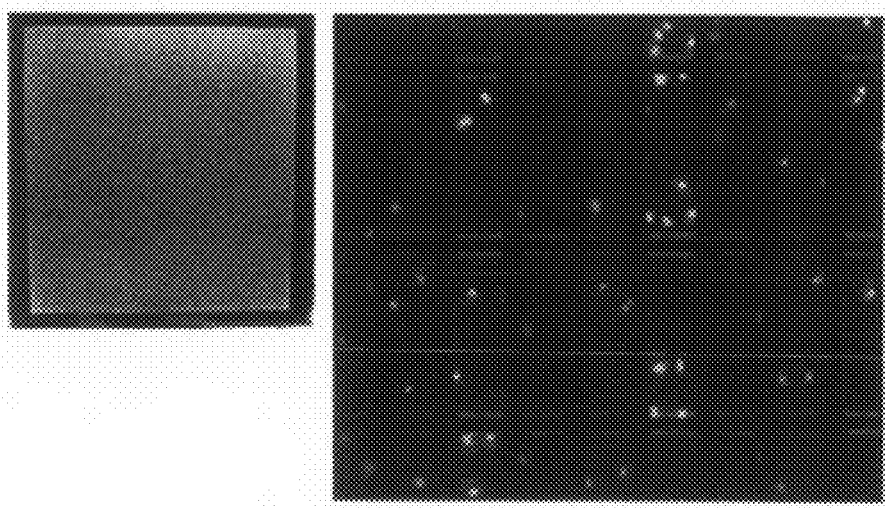
FIGS. 6A-6B illustrate photographs of an LCD having spherically-shaped spacers and a LCD according to an embodiment of the present invention, respectively.

A conventional LCD device, i.e., a LCD device having ball-shaped spacers, was compared to a LCD device according to an embodiment of the present invention, i.e., a LCD device having the patterned spacers 136, in terms of light leakage. Results are illustrated in FIGS. 6A-6B.

Figure 6B:
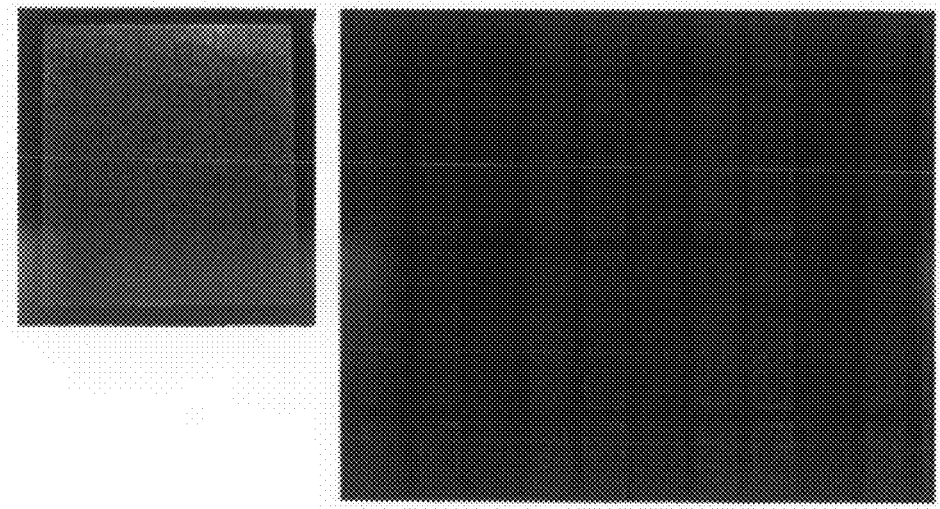

As can be seen in FIG. 6B, i.e., a photograph illustrating the LCD device according to the embodiment of the present invention, the structure of the patterned spacers substantially minimized and/or eliminated light leakage through the substrates and provided uniform light transmissivity. The LCD having ball-shaped spacers, as illustrated in FIG. 6A, exhibited light stains of different colors, i.e., from different sub-pixels, thereby providing non-uniform light luminance and transmissivity.

According to embodiments of the present invention, a LCD device may exhibit a substantially minimized or eliminated light leakage when forming patterned spacers to entirely overlap with black matrix portions expanded to substitute portions of respective color filter patterns on the upper substrate.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A liquid crystal display (LCD) device, comprising:
    a first substrate having a plurality of first electrodes;
    a second substrate facing the first substrate and having a plurality of second electrodes, the second electrodes being perpendicular to the first electrodes to define sub-pixels at intersection regions between the first and second electrodes;
    a liquid crystal layer between the first and second substrates;
    a plurality of color filters between the first and second substrates adapted to correspond to respective sub-pixels, the color filters including first color filters and second color filters having a different shape than the first color filters;
    a black matrix between the color filters, the black matrix including vertical portions, horizontal portions, and step portions, each of the step portions corresponding to a respective second color filter; and
    a plurality of patterned spacers between the first and second substrates, each of the patterned spacers overlapping with a respective step-portion of the black matrix.

2. The LCD device as claimed in claim 1, further comprising first and second alignment layers on inner surfaces of the first and second substrates, respectively.

3. The LCD device as claimed in claim 1, wherein the black matrix is on an inner surface of the second substrate.

4. The LCD device as claimed in claim 1, wherein the color filters include red, green, and blue color filters.

5. The LCD device as claimed in claim 4, wherein three sub-pixels corresponding to red, green, and blue color filters define a single unit pixel with one second filter.

6. The LCD device as claimed in claim 5, wherein the second filter is a red, green, or blue color filter.

7. The LCD device as claimed in claim 1, wherein the second filters have a bent shape.

8. The LCD device as claimed in claim 7, wherein the bent shape of the second filters is a shape having a missing corner portion as compared to a shape of the first color filters.

9. The LCD device as claimed in claim 8, wherein the step portion of the black matrix is positioned to replace the missing corner portion of a respective second color filter.

10. The LCD device as claimed in claim 7, wherein the second filters are longitudinal.

11. The LCD device as claimed in claim 1, wherein the first color filters have a substantially same shape as the sub-pixels.

12. The LCD device as claimed in claim 1, wherein the patterned spacers are in direct contact with the second electrodes.

13. The LCD device as claimed in claim 1, wherein each step portion of the black matrix is in contact with the vertical and horizontal portions of the black matrix.

14. The LCD device as claimed in claim 1, wherein the step portion of the black matrix is wider than the vertical portion of the black matrix.

15. The LCD device as claimed in claim 1, wherein each of the patterned spacers is entirely overlapping with a respective step-portion of the black matrix.

16. The LCD device as claimed in claim 1, wherein the step portion of the black matrix is wider than a diameter of the patterned spacer.

17. The LCD device as claimed in claim 1, wherein the patterned spacers are positioned at equal intervals from one another.

18. A method for manufacturing a liquid crystal display (LCD) device, comprising:
    forming a first substrate having a plurality of first electrodes to face a second substrate having a plurality of second electrodes, the second electrodes being perpendicular to the first electrodes to define sub-pixels at intersection regions between the first and second electrodes;
    forming a liquid crystal layer between the first and second substrates;
    forming a plurality of color filters between the first and second substrates to correspond to respective sub-pixels, the color filters including first color filters and second color filters having a different shape than the first color filters;
    forming a black matrix between color filters, the black matrix including vertical portions, horizontal portions, and step portions, each of the step portions corresponding to a respective second color filter; and
    forming a plurality of patterned spacers between the first and second substrates, each of the patterned spacers overlapping with a respective step-portion of the black matrix.

19. The method as claimed in claim 18, wherein forming the first and second color filters includes forming the second color filters to have a bent shape having a smaller cross-sectional area than the first color filters.

20. The method as claimed in claim 18, wherein forming the first and second color filters includes forming red, green, and blue color filters to define a single unit pixel, so each unit pixel includes two first color filters and one second color filter.

* * * * *